United States Patent [19]
Nakamura

[11] 3,842,989
[45] Oct. 22, 1974

[54] APPARATUS FOR REVERSING ELONGATED BODIES

[75] Inventor: Atushi Nakamura, Osaka, Japan

[73] Assignee: Nittan Kohki Kabushiki Kaisha a/k/a Nittan Kohki Co., Ltd., Sakai Osaka, Japan

[22] Filed: Feb. 13, 1973

[21] Appl. No.: 332,167

[30] Foreign Application Priority Data
  May 22, 1972  Japan.............................. 47-51061
  June 27, 1972  Japan.............................. 47-64616

[52] U.S. Cl.......... 214/1 QD, 214/1 QG, 294/86 LS
[51] Int. Cl............................................... B65g 7/00
[58] Field of Search....... 294/78 A, 86 LS; 214/1 Q, 214/46.32, 1 QD, 46.24, 1 QG, 130 R, 130 C

[56] References Cited
UNITED STATES PATENTS

| | | | |
|---|---|---|---|
| 1,775,851 | 9/1930 | Ely.................................. | 214/1 QG |
| 2,390,293 | 12/1945 | Colson.......................... | 214/1 QD X |
| 2,530,333 | 11/1950 | Jose.............................. | 214/1 QD X |
| 3,181,709 | 5/1965 | Kinnicutt, Jr. et al........... | 214/1 QG |
| 3,606,033 | 9/1971 | Barilla............................. | 214/1 Q |

FOREIGN PATENTS OR APPLICATIONS

| | | | |
|---|---|---|---|
| 126,796 | 6/1959 | U.S.S.R.......................... | 294/86 LS |

*Primary Examiner*—Frank E. Werner
*Attorney, Agent, or Firm*—Wenderoth, Lind & Ponack

[57] ABSTRACT

A reversing apparatus for reversing an elongated body has a rotary member rotatably mounted on a support member and a pair of nip-holding members on the rotary surface of the rotary member with a suitable space therebetween. Each end of the elongated body is inserted between the opposing faces of the nip-holding members, and the elongated body is rotated together with the rotary member by lifting the support member.

5 Claims, 10 Drawing Figures

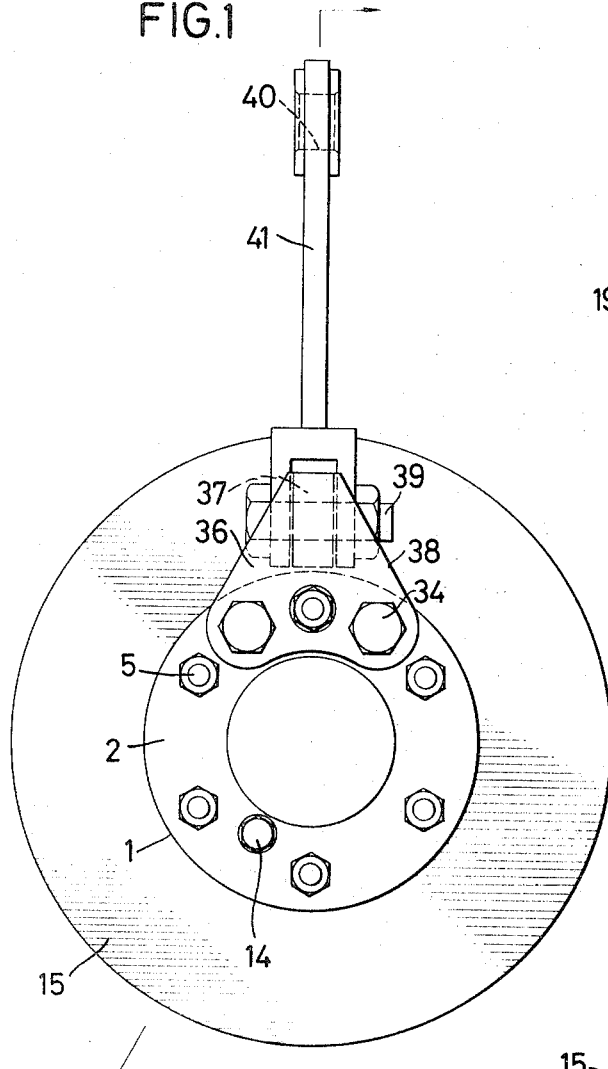
FIG.1
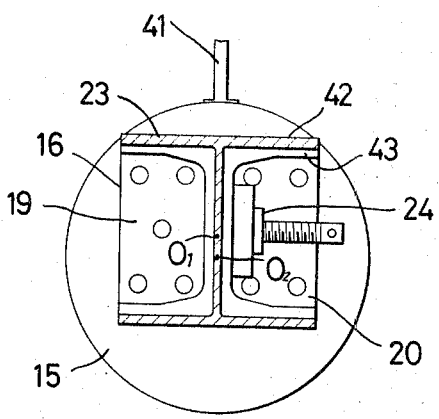
FIG.4
FIG.2
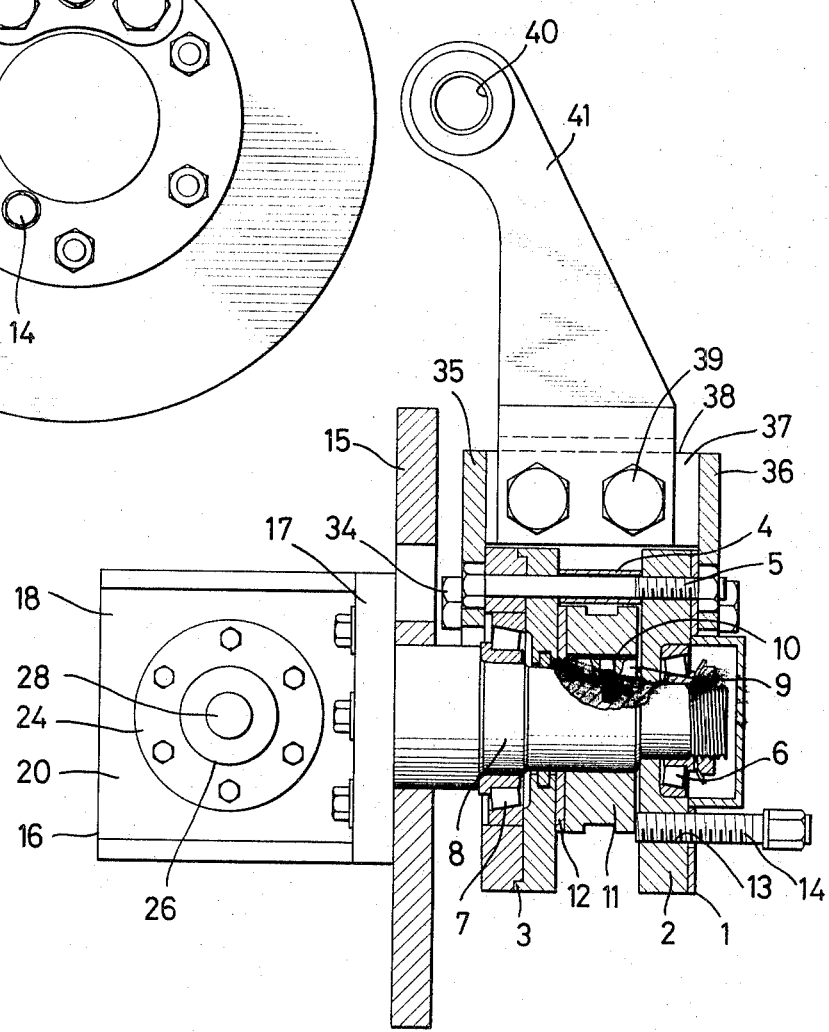

APPARATUS FOR REVERSING ELONGATED BODIES

This invention relates to an apparatus for reversing elongated bodies, such as I-steel and channel steel materials, and elongated bodies having various different sectional shapes, such as tubular, shaft-shaped and the like.

In case various processes, such as drilling bolt holes, welding and painting, are applied to an elongated body of section steel or the like, it is usual that the lower face or one face of said elongated body is first processed and then the upper face or the other face thereof is processed. Since it is necessary to turn over the elongated body in such a case, said elongated body is lifted at one end thereof by a crane or chain block and then turned over by the hands of workmen. This conventional method, however, has a defect in that the reversing operation of the elongated body not only requires a great deal of time and labor but also involves a risk since said elongated body is lifted at one end thereof only, and moreover it is difficult to turn over said elongated body precisely to a predetermined position.

A first object of this invention is to provide an apparatus making it possible to turn over an elongated body with ease and safety by rotatably lifting the elongated body at both ends thereof by means of rotary members mounted on support members.

A second object of this invention is to provide an apparatus making it possible to turn over automatically the elongated body simply by lifting said elongated body by means of the support members and without the necessity of any manual or mechanical power.

A third object of this invention is to enable not only to perform most stably the lifting operation for the reversion by suspension of the elongated body at both ends thereof, but also to lower with accuracy said elongated body after reversion onto the surface of a predetermined location.

These and other objects are accomplished by the parts, improvements, combinations and arrangements comprising the invention, preferred embodiments of which are shown by way of example in the annexed drawings and herein described in detail.

FIG. 1 is an elevation showing the first embodiment of this invention.

FIG. 2 is a vertical, sectional side view taken by the line II—II in FIG. 1.

FIG. 4 is a rear view of an elongated body nip-holding member showing the second embodiment of the invention.

Figure 3:
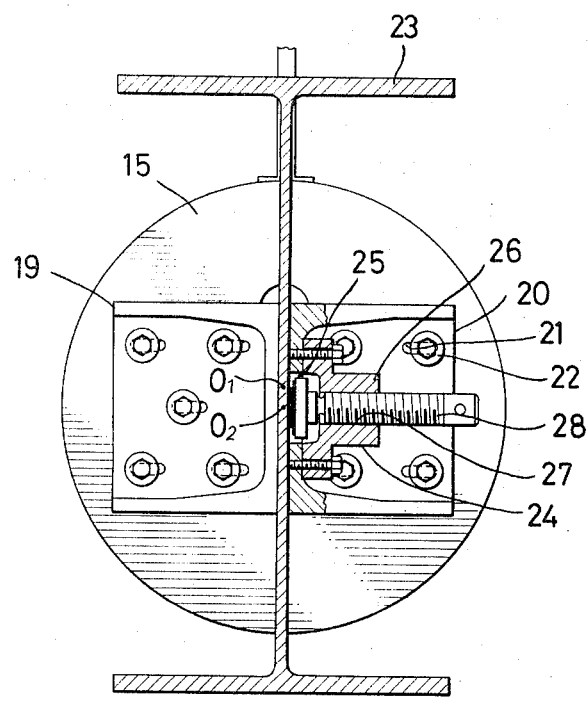
FIG. 3 is a vertical, sectional rear view of a nip-holding member showing the state in which an elongated body is held by said member.

Referring to FIGS. 1 to 3 and 9 showing the first embodiment of this invention, the numeral 1 denotes a support member comprising a front plate 2 and a rear plate 3 both in the shape of an annular disk and so disposed as to be opposed to each other, said front and rear plates 2, 3 being coaxially bound together by means of a plurality of bolts 5 with a plurality of spacing pieces 4 interposed therebetween, bearings 6, 7 being built in inside the central penetration holes of the front and rear plates 2, 3, a rotary shaft 8 supported at both ends thereof by the bearings 6, 7 being rotatably and transversely provided between the front and rear plates 2, 3.

In the middle part of the rotary shaft 8 traversing the space between the opposing faces of the front and rear plates 2, 3 is built a brake rotor 11 through the medium of a key 9 and a key slot 10, said brake rotor 11 being integrated with said rotary shaft 8 in the direction of rotation thereof, while capable of travelling in the direction of the axis thereof, a friction disk 12 being outwardly interposed between the rotor 11 and the rear plate 3.

In the lower part of the front plate 2 is bored a screw hole 13 in a position coinciding with the end face of the brake rotor 11, a bolt 14 for controlling the damping force being screwed into the screw hole 13 from the outside so that the front end of said bolt 14 will be brought into contact with the brake rotor 11 thereby making it possible to control the rotation of the rotary shaft 8 by varying the pressure of the rotor 11 against the friction disk 12.

A nip-holding member mounting seat 15 in the shape of a circular plate is secured to the rear end of the rotary shaft 8 rearwardly projecting from the rear face of the rear plate 3.

The nip-holding member mounted on the mounting seat 15 comprises a mounting plate 17 fitted to the mounting seat 15 and a pair of nip-holders 19, 20 each provided with a nip-holding plate 18 rearwardly and normally erected on one side of the mounting plate 17, the nip-holders 19, 20 being so disposed that the nip-holding plates 18 will be opposed to each other with the axis of the mounting seat 15 interposed therebetween, a plurality of mounting holes 21 transversely elongated being provided on the mounting plate 17 thereby enabling to detachably secure said mounting plate 17 to the mounting seat 15 by means of constriction bolts 22 inserted into said elongated holes 21. Since the transverse movement of the nip-holders 19, 20 is adjustable within the scope of the elongated holes 21 by means of adjustment of the bolts 22, the space between the opposing faces of the nip-holding plates 18, that is, the space for nip-holding an elongated body 23, is adjustable according to the thickness thereof.

In the middle part of one nip-holder 20 is provided a fixing device 24 for fixing the elongated body 23, the fixing device 24 comprising a short tubular member 26 secured to the outside of a penetration hole 25 bored through the center of the nip-holding plate 18 so as to cover said penetration hole 25, a screw rod 28 being screwed into a screw hole 27 provided in the center of the short tubular member 26 so as to be reciprocatable by a rotary operation from the outside.

Figure 8:
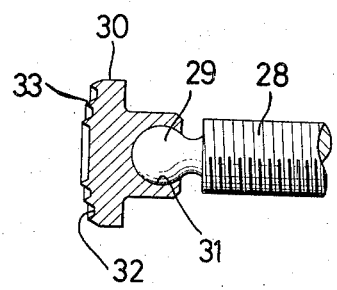
FIG. 8 is a vertical, sectional side elevation showing a fixing device used in the elongated body nip-holding member of the first, second and third embodiments.

A globular member 29 is continuously formed at the front end of the screw rod 28 as shown in FIG. 8, a pressure head 30 receivable in the penetration hole 25 being fitted to said globular member 29.

The pressure head 30 is in the shape of a circular plate, a globular recess 31 for holding in captivity the globular member 29 being formed on a stem member erected on the rear part of said pressure head 30, the engagement between the globular member 29 and the globular recess 31 enabling the pressure head 30 to rotate in all directions on the front side, the front face of the pressure head 30 constituting a bulging globular face 32 of a large diameter, a plurality of tapering annular ridges 33 being concentrically erected on said front face, said ridges 33 being brought into contact with the side face of the elongated body 23 by screwing the screw rod 28 into the screw hole 27.

Furthermore, in the upper part between the front and rear plates 2, 3 of the support member 1 is fitted a support implement 38 provided with a transverse plate 37 in parallel with the rotary shaft 8 between upright projections 35, 36 secured by bolts 34 to the exterior faces of the front and rear plates 2, 3 by the overlapping portions respectively, on said support implement 38 being outwardly mounted a suspension member 41 by securing with bolts 39 the lower bifurcated portion thereof to the transverse plate 37, said suspension member 41 being provided with a suspension hole 40 bored through the upwardly projecting end thereof.

The function of the first embodiment of this invention is herein described. A pair of reversing apparatuses are disposed at both ends of an elongated body, a rope of a crane or the like being bound through the suspension hole 40 of each suspension member 41. The rotary shaft 8 is secured by bringing the brake rotor 11 into pressure contact with the friction disk 12 by tightening the bolt 14 in the state that the nip-holding plates 18 of the nip-holders 19, 20 are substantially vertical. Then, each end of the elongated body 23 to be turned over is inserted between the nip-holding plates 18, each end face of the elongated body 23 being brought into contact with the mounting seat 15, the rotary center of the nip-holding member 16, i.e., the axis of the rotary shaft 8, being positioned slightly lower than the centroid $O_1$ of the elongated body 23 as shown in FIG. 3, the screw rod 28 of the fixing device 24 being screwed in thereby bringing the pressure head 30 into pressure contact with the side face of the elongated body 23 constricted between the nip-holding plates 18.

If the elongated body 23 is slightly elevated by lifting the support member 1 by winding the rope of the crane, a downward rotary force centering on the globular member 29 is applied to the head 30 as a result of a downward action of the weight of the elongated body 23. Consequently, the ridges 33 on the exterior periphery of the head 30 are brought into pressure contact with the elongated body 23 thereby preventing said elongated body 23 from displacement or dropping at the time of elevation.

Then, if the friction between the brake rotor 11 and the friction disk 12 is reduced by gradually retracting the bolt 14 of the support member 1, the weight of the elongated body 23 above the line connecting the nip-hold parts at both ends becomes greater since the centroid $O_1$ of the elongated body 23 is above the rotary center $O_2$ of the nip-holding member 16, as a result of which the centroid $O_1$ of the elongated body 23 gradually rotates through the rotary shaft 8 in a direction slightly inclined to one side from above the rotary center $O_2$ of the nip-holding member 16. When the elongated body 23 stops after completing rotation by 180 degrees, said elongated body 23 is lowered by operating the crane, the constriction being then eased by loosening the screw rod 28 of the fixing device 24 thereby enabling to dismount the nip-holding members from both ends of the elongated body 23.

In the first embodiment described hereinbefore, a crane was used for lifting the elongated body 23 for reversion thereof. However, a lifting device can be provided at each end of the elongated body 23, a support member 1 being mounted on the upper end of each elevatable shaft of said device. In this instance, the suspension member 41 in the first embodiment is unnecessary since the support member 1 can be mounted on the elevatable shaft by fixing the support implement 39 upside down.

The second embodiment of this invention as shown in FIG. 4 is herein described. The parts of same structure and performing the identical function with those in FIGS. 1 to 3 are marked by the identical symbols, explanation thereof being omitted.

In the instance of the second embodiment, the vertical center of the nip-holding member 16 is so disposed as to be eccentric in relation to the axis of the rotary shaft 8 by altering the mounting position of said nip-holding member 16 on the mounting seat 15. This embodiment is applicable when, as in the case of I-steel or channel steel material, the elongated body 23 has flange members 42 on the upper and lower sides thereof, and when the distance between the opposing flange members 42 is substantially same as the height of the nip-holding plates 18 of the nip-holding member 16.

As shown in FIG. 4, the nip-holding member 16 is mounted on the mounting seat 15 so that the center of the vertical distance of nip-holding plates 18 of the nip-holders 19, 20 will be eccentric in relation to the rotary center of the mounting seat 15, each flange member 42 of the elongated body 23 being received by the upper and lower receiving plates 43 horizontally and outwardly extending on the upper and lower edges of the nip-holding plates 18 respectively.

When the elongated body 23 is lifted, the centroid $O_1$ of the elongated body 23 can be positioned higher than the rotary center $O_2$ of the nip-holding member 16 simply by constricting the elongated body 23 by said nip-holding member 16 thereby making it possible to turn over the elongated body 23 making use of the rotary shift of the centroid of said elongated body 23 as simply as in the instance of the first embodiment.

Moreover, in the instance of the first and second embodiments, the nip-holding member 16 is provided with nip-holding plates 18 each in the shape of a rectangular plate. However, if tapering nip-holding plates are used, said nip-holding plates are capable of supporting an elongated tubular body by fitting thereinto.

Figure 6:
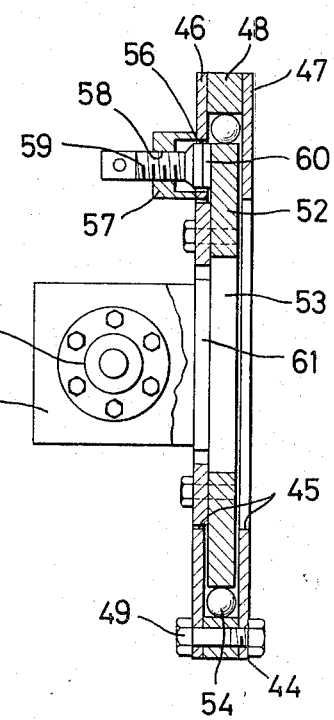
FIG. 6 is a vertical, sectional side elevation of said third embodiment.
Figure 5:
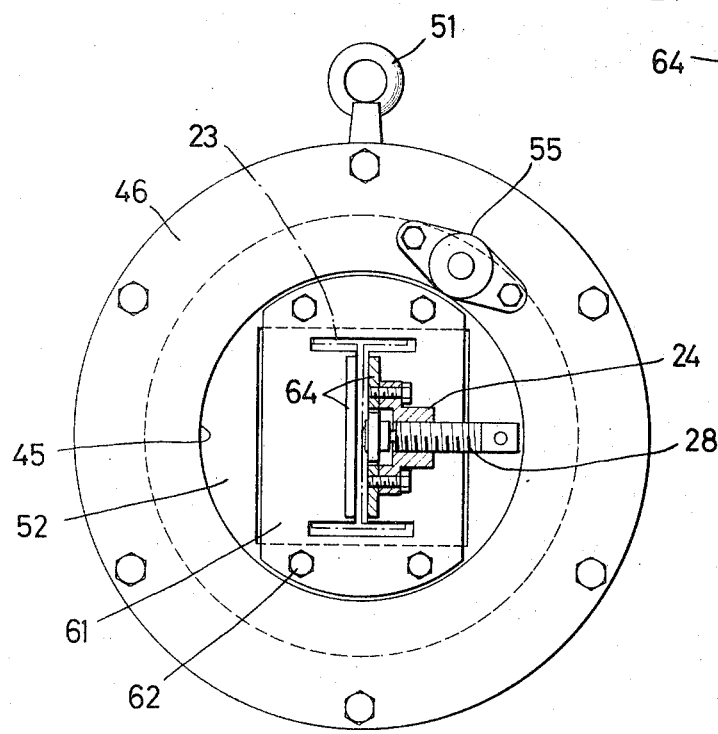
FIG. 5 is an elevation, vertically sectional in part, showing the third embodiment of the invention.
Figure 7:
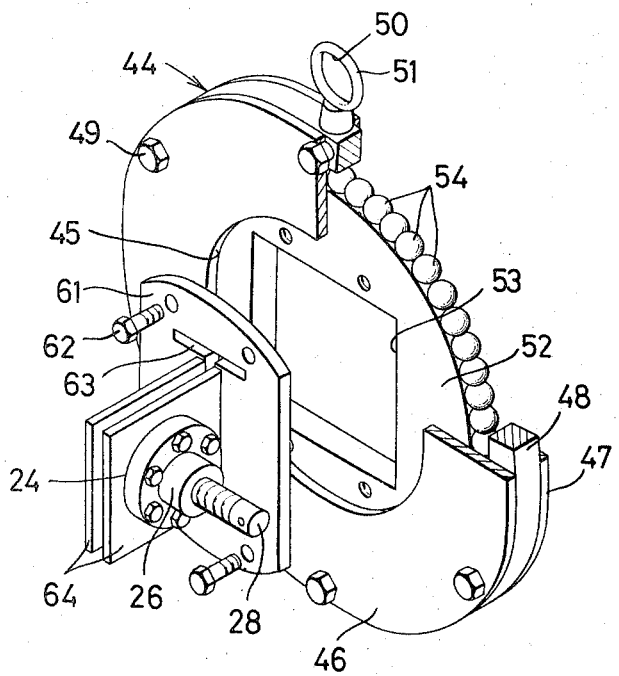
FIG. 7 is a disassembled perspective, broken away in part, of said third embodiment.

Now referring to FIGS. 5 to 7, the third embodiment of this invention is herein explained. The parts having the same construction and function as those in FIGS. 1 to 4 are marked with the identical symbols, explanation of the respective parts being omitted.

The third embodiment differs from the first and second embodiments in that it enables to support an elongated body by intermediate portions between both ends thereof with the result that the lifting and reversing operation is practicable with stability. The numeral 44 designates a support member, said support member 44 comprising a pair of annular plates 46, 47 of the identical shape provided with a circular penetration hole 45 in the center respectively, between said annular plates 46, 47 being interposed an intermediate annular plate 48 having a substantially same exterior diameter as those of the annular plates 46, 47 and an inner diameter larger than the diameter of the penetration hole 45, said three members 46, 47, 48 being concentrically overlapped and integrally secured to each other by bolts 49 and nuts or the like.

On the outer periphery of the intermediate annular plate 48 is mounted a projection 51 provided with a suspension hole 50 for suspension, a rotary disk 52 being incorporated into the intermediate annular plate 48.

The rotary disk 52 has a slightly smaller diameter than the inner diameter of the intermediate annular plate 48, a square hole 53 of which the diagonal is smaller than the diameter of the penetration hole 45 being provided in the center of the rotary disk 52, the peripheral edge of said rotary disk 52 being sandwiched in between the opposing faces of the annular plates 46, 47, a number of steel balls being interposed between the outer periphery of the rotary disk 52 and the inner periphery of the intermediate annular plate 48, the rotary disk 52 being mounted coaxially and rotatably on the support member 44 by means of said steel balls 54.

On the outside of the annular plate 46 is provided a brake device 55. This brake device 55 comprises a small hole 56 bored through a peripheral face of the annular plate 46 in a position coinciding with the rotary disk 52; a screw hole 58 passing through a short tubular member 57 secured on the small hole 56 on the outside of the annular plate 46; a friction plate 60 receivable into the small hole 56 and secured to the front end of a screw rod 59 reciprocatably screwed into the screw hole 58; said friction plate 60 being brought into pressure contact with the side face of the rotary disk 52 by screwing the screw rod 59 thereby enabling to adjust the rotary speed of the rotary disk 52 or completely stop the rotation thereof.

Furthermore, on a rotary face of the rotary disk 52 exposed through the penetration hole 45 is detachably mounted a support plate 61 by means of bolts 62, in the center of said support plate 61 being provided a penetration hole 63 communicating with the square hole 53 of the rotary disk 52 and the penetration hole 45 and similar to and slightly larger than the sectional shape of the elongated body 23.

On both sides of the perpendicularly shaped part of the penetration hole 63 on the outside of the support plate 61 are erected a pair of opposing nip-holding plates 64, the opposing faces of said nip-holding plates 64 being fixed so that the space therebetween will be substantially same as the space between the opposing wall edges of the vertical sections of the penetration hole 63.

As shown in FIG. 8, on the outside of the nip-holding plate 64 is provided the same fixing device 24 for rigidly securing an elongated body 23 as in the instance of the first embodiment.

Figure 10:
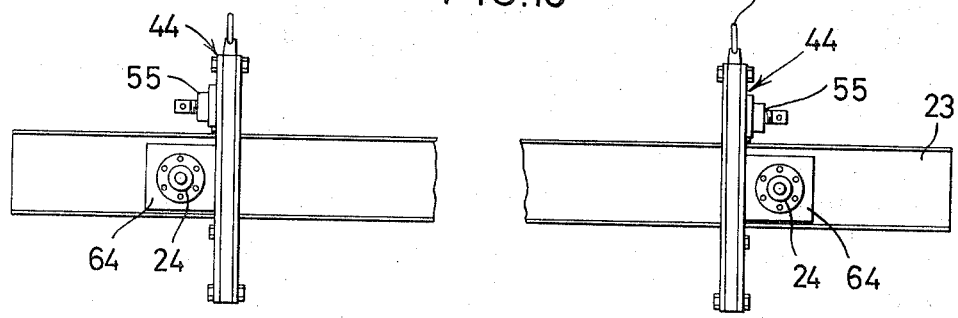
FIG. 10 is a side elevation showing the state in which an elongated body is supported by the apparatus of the third embodiment.
Figure 9:
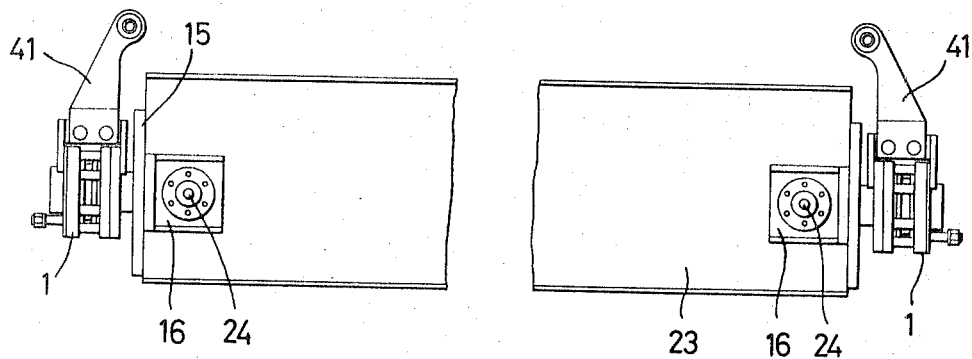
FIG. 9 is a side elevation showing the state in which an elongated body is supported by the apparatus of the first embodiment.

Next, the function of the third embodiment of this invention is herein explained. As in the case of the first embodiment, a pair of reversing apparatuses are disposed on both sides, ropes of a crane or the like being bound through the suspension holes 50 of the suspension projections 51 respectively, to the center of the rotary disk 52 being secured the support plate 61 having a penetration hole 62 substantially same as the sectional shape of the elongated body to be turned over, the rotary disk 52 being secured to the support member 44 by operating the brake device 55 by means of tightening the screw rod 59, the elongated body 23 being inserted at each end thereof into the support member 44 between the nip-holding plates 64 and through the penetration hole 63, the square hole 53 and the penetration hole 45, thereby enabling to dispose each support member 44 at the required position at each side of the elongated body 23, the centroid $0_1$ of the elongated body 23 being adapted to be located higher than the rotary center $0_2$ of the rotary disk 52 within the scope of the penetration hole 63, the pressure head 30 being brought into pressure contact with the side face of the elongated body 23 so that said elongated body 23 is compressed between said pressure head 30 and the nip-holding plates 64 are shown in FIGS. 5 and 10.

In this state, by operating the crane and lifting the support member 44, the elongated body 23 is elevated slightly from the surface on which it was laid.

Now, if the friction between the friction plate 60 and the rotary disk 52 is reduced by retracting the screw rod 59 of the brake device 55, the centroid $0_1$ of the elongated body 23 is inclined to either direction from above the rotary center $0_2$ of the rotary disk 52 with the result that the elongated body 23 rotates by 180° in relation to the support member 44 together with the support plate 61 and the rotary disk 52 through the steel balls 54 until said elongated body 23 comes to a stop as a result of descent of the centroid thereof.

Then, the elongated body 23 thus reversed is lowered onto the surface on which said elongated body 23 was located by operating the crane, the support member being detached from each end of the elongated body 23 by loosening the fixing device 24.

In the third embodiment described hereinbefore, the support plate 61 is secured to the rotary disk 52 so that the rotary center of the penetration hole 63 will coincide with the rotary center of said rotary disk 52 and hold the elongated body 23 in an eccentrical state. However, a support plate preliminarily provided with a penetration hole 63 can be fixed so that the rotary center of said penetration hole 63 will be positioned slightly higher than the rotary center of the rotary disk 52.

What is claimed is:

1. A reversing apparatus for reversing an elongated body, said apparatus comprising a support member having a bore extending through the center thereof, said bore being of a larger diameter than the diameter of the elongated body, a rotary disk rotatably mounted on said support member, said rotary disk having a square hole through which said elongated member may be inserted, the member being supported therein, a nip-holding member support plate having a penetration hole extending therethrough, substantially with the same shape as a section of the elongated body and mounted on the peripheral portion of the square hole of the rotary disk, a pair of oppositely positioned nip-holding members detachably mounted on said rotary disk by means of said nip-holding member support plate, the penetration hole of said nip holding member support plate communicating with the hole of said rotary disk, the elongated body being rotated together with the rotary member by lifting the support member.

2. A reversing apparatus as claimed in claim 1, wherein a means for adjustably pressing the elongated body against the inner face of one of said pair of nip-holding members is provided on the other nip-holding member.

3. A reversing apparatus as claimed in claim 1, wherein a means for braking the rotation of said rotary disk is provided on the support member.

4. A reversing apparatus as claimed in claim 1, wherein said nip-holding members are adapted to be adjustable with respect to the separation therebetween.

5. A reversing apparatus as claimed in claim 1, wherein said nip-holding members are mounted on said rotary disk such that the center of the elongated body held by said nip-holding member is positioned above the center of the rotary disk.

* * * * *